Patented Nov. 26, 1940

2,222,968

UNITED STATES PATENT OFFICE 2,222,968

INSECTICIDAL COMPOSITION

George L. Hockenyos, Springfield, Ill., assignor to Monsanto Chemical Company, St. Louis, Mo., a corporation of Delaware No Drawing. Application October 7, 1935, Serial No. 43,895

7 Claims. (Cl. 167—34)

The present invention relates to insecticidal compositions and it has particular relation to such compounds which contain nicotine as an effective ingredient.

The main objects of the invention are to provide:

A nicotine derivative in which the insecticidal powers of the nicotine are retained to a high degree, which is soluble in an oil medium and insoluble in water;

A concentrated oil dispersion of nicotine which may be dispersed in water to give solutions suitable for spraying or otherwise applying to objects infested or likely to become infested by insects;

An insecticidal composition containing as an effective ingredient a nicotine compound which is of low volatility and which is not washed away from objects to which it is applied by rain or other applications of water and which upon application remains active for long periods of time;

An insecticidal composition which may be applied to green foliage and other relatively sensitive tissues without substantial damage thereto;

An insecticidal composition of the above indicated character which is economical and simple to prepare and apply.

These and other objects will be apparent from consideration of the following description and the accompanying claims.

Nicotine has heretofore been suggested as a valuable agent for the extermination of insect life, especially of such species as attack growing plants. Although it is comparatively safe for application to the growing foliage and is still quite effective as against insect pests, it is found in actual practice that it is quite soluble in water and is also comparatively volatile. Therefore, upon application, it soon evaporates, or if exposed to rain or dew, it is quickly washed away, thus leaving the plant life to which it is applied unprotected. For this reason much time and effort has been expended by research workers in an endeavor to obtain a composition comprising nicotine as an effective ingredient which would be retained permanently upon objects exposed to air and water.

Efforts to reduce volatility and solubility of the nicotine by dissolving it in oil and emulsifying the oil with water to form a spray solution suitable for application to living plants have not been successful because the nicotine is more readily soluble in water than in oil. Therefore, upon emulsification of the oil solution with water, the nicotine passed into the aqueous phase and was applied as a water solution rather than an oil solution.

The present invention is based upon the discovery that nicotine will readily react with hydrocarbon substituted phenols, such as ortho amyl phenol, para amyl phenol, diamyl phenol, etc., to give chemical compounds which may be dissolved in oil and then dispersed in water to provide spray compositions for plants or other objects, and which, after application, are relatively non-volatile and of low solubility in water.

The preparation of these compounds of nicotine and alkylated phenols is quite simple. All that is required is merely to bring the ingredients into contact with each other in the ratio of one mol of nicotine or nicotine sulfate to two mols of the phenolic substance in enough non-volatile oil, such as "white oil" of a viscosity of 80 (Saybolt) to bring them into solution. Any other inert solvent may, of course, be employed. The reaction occurs spontaneously and at normal or room temperatures and is attended by the evolution of heat.

Diamyl phenol is a typical example of a phenolic compound which readily reacts with nicotine in accordance with the provisions of the present invention. When the nicotine and the diamyl phenol are combined in accordance with the foregoing directions, reaction immediately takes place and the resultant product is obtained as a liquid which is comparatively non-volatile and which cannot be distilled without material decomposition. Accordingly its boiling point is not known.

A plant spray may be made up by emulsifying 12 parts of this reaction product dissolved in the above described oil (e. g. 88 parts of oil) with enough water to make a 1% emulsion of the oil solution. All of the oil may be employed as the reaction vehicle, or a concentrate may be made and this then diluted for use. For purposes of forming a permanent emulsion, any suitable emulsifying agent may be employed, examples of which are gum gatti, casein, gum arabic, ammonium caseinate. The material acts either as a contact or a stomach poison.

The same method may be employed in making insecticidal compositions from the reaction products of nicotine and other higher homologues of phenol. The nicotine retains substantially its full effectiveness. Therefore, the amount of material required for specific applications will be based upon the molecular equivalent of nicotine contained therein, and the higher the homologue, the greater the amount of the compound required to effect extermination of insects.

The application of such compositions to plant life is conventional. For example, it may be made by spraying or sprinkling, or in any other suitable manner. Of course, the quantity employed should be sufficient thoroughly to wet the foliage.

The invention is not limited to the use of reaction products of nicotine and diamyl phenol. Butylated phenol, hexylated phenol, cyclohexylated phenol and higher homologues of phenol, such as those containing 8, 10 and 12 carbon atoms, either as straight or branched chains, substituted as side chains in the aromatic nucleus, also react in the same manner. The number of side chains introduced into the aromatic nucleus may be one or two or even more. Cresol and phenol are not suitable, because of undue water solutions, thereby sharply distinguishing from applicant's materials. The resultant products may readily be dissolved in oils and then emulsified with water to give excellent insecticidal compositions. These compositions are effective against various types of insect life, but are especially satisfactory for the eradication and prevention of codling moths, aphids, fleas, beetles and the like. The new materials may also be applied to inert pulverulent materials to provide dusting powders for plants or animals.

It will be appreciated that nicotine and alkylated phenols which constitute the main ingredients of applicant's materials are both relatively inexpensive to obtain. The steps involved in reacting the ingredients are simple and substantially inexpensive and no purification of the material is required. Only a small amount of oil is required in preparing a large volume of insecticidal spray. The water required in making up the emulsions, of course, may be obtained without any expense and when the spray is applied to plants the water evaporates and only a small amount of oil is left as a coating film upon the objects to be protected. This amount is so slight that the plants or other objects are not substantially smeared or damaged thereby.

Although only certain forms of the invention have been described, it will be manifest that these are merely illustrative and that numerous modifications may be made therein without departure from the spirit of the invention or the scope of the appended claims.

What I claim is:

1. A reaction product of nicotine and a benzene hydrocarbon having a hydroxyl radical substituent joined directly to the benzene nucleus and having at least one additional substituent consisting of a radical selected from the group consisting of the cyclohexyl radical and alkyl radicals containing at least four carbon atoms, said product, when present in an oil-water emulsion, remaining substantially entirely in the oil phase and being substantially absent from the water phase.

2. A reaction product of one mol of nicotine and two mols of an alkyl-substituted benzene having a hydroxyl radical substituent, the alkyl substituent containing at least four carbon atoms, said product, when present in an oil-water emulsion, remaining substantially entirely in the oil phase and being substantially absent from the water phase.

3. The "white oil" soluble reaction product of nicotine and phenol which phenol is substituted in the aromatic nucleus by an alkyl group having four to twelve carbon atoms, said reaction product being further characterized in that an oil solution when emulsified with water retains said reaction product in the oil phase.

4. The "white oil" soluble reaction product of nicotine and a material selected from the group consisting of butyl phenol, amyl phenol, diamyl phenol and cyclohexylphenol, said reaction product being further characterized in that an oil solution when emulsified with water retains said reaction product in the oil phase.

5. An insecticidal composition comprising an aqueous oil emulsion, the oil phase having dissolved therein the substantially water-insoluble reaction compound of nicotine and phenol, which phenol is substituted in the aromatic nucleus by an alkyl group having four to twelve carbon atoms, and the reaction product being relatively non-volatile as compared to nicotine.

6. An insecticidal composition comprising an aqueous oil emulsion, the oil phase having dissolved therein the substantially water-insoluble reaction product of nicotine and amyl phenol, and the reaction product being relatively non-volatile as compared to nicotine.

7. An insecticidal composition comprising an aqueous oil emulsion, the oil phase having dissolved therein the substantially water-insoluble reaction product of nicotine and diamyl phenol, and the reaction product being relatively non-volatile as compared to nicotine.

GEORGE L. HOCKENYOS.